June 30, 1942.   W. H. SCHMELING   2,288,489
SELF FEEDER FOR LIVESTOCK
Filed June 4, 1941   2 Sheets-Sheet 1
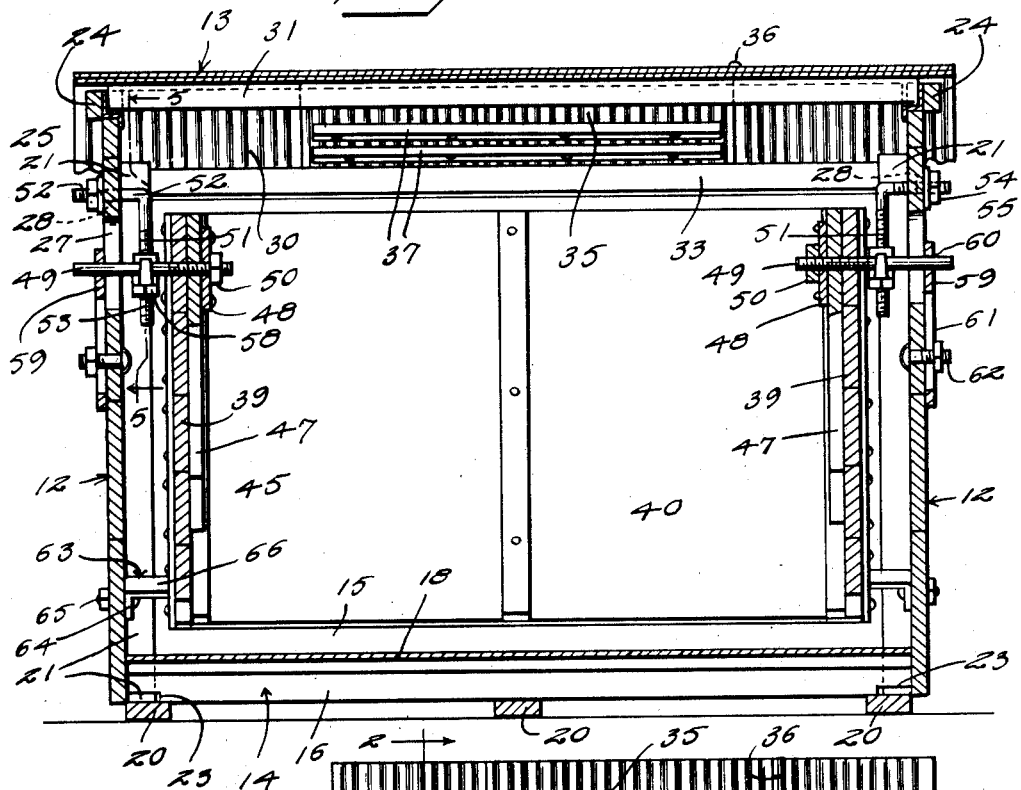
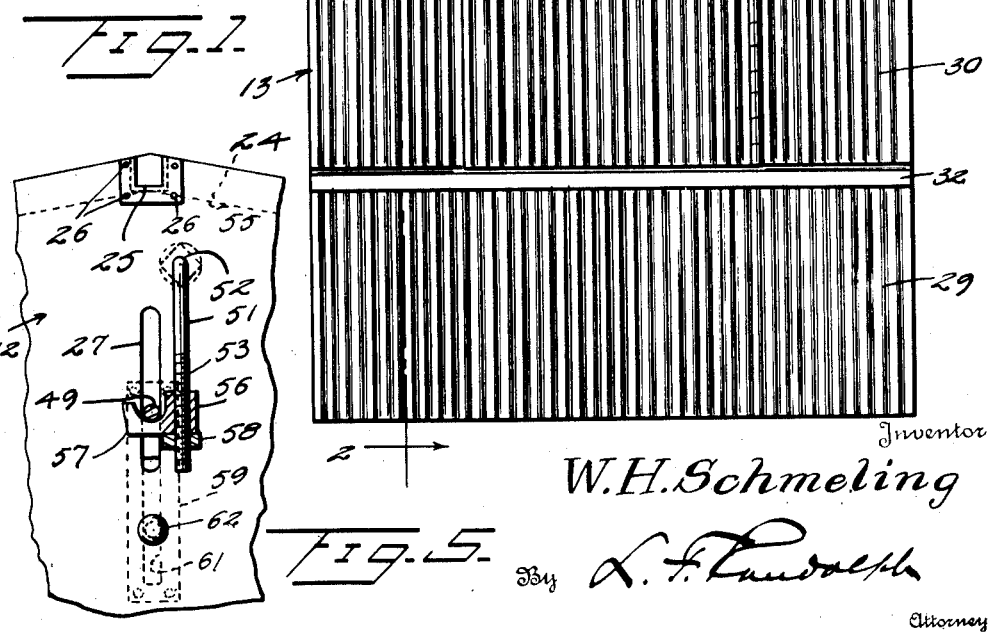
Inventor
W. H. Schmeling
Attorney

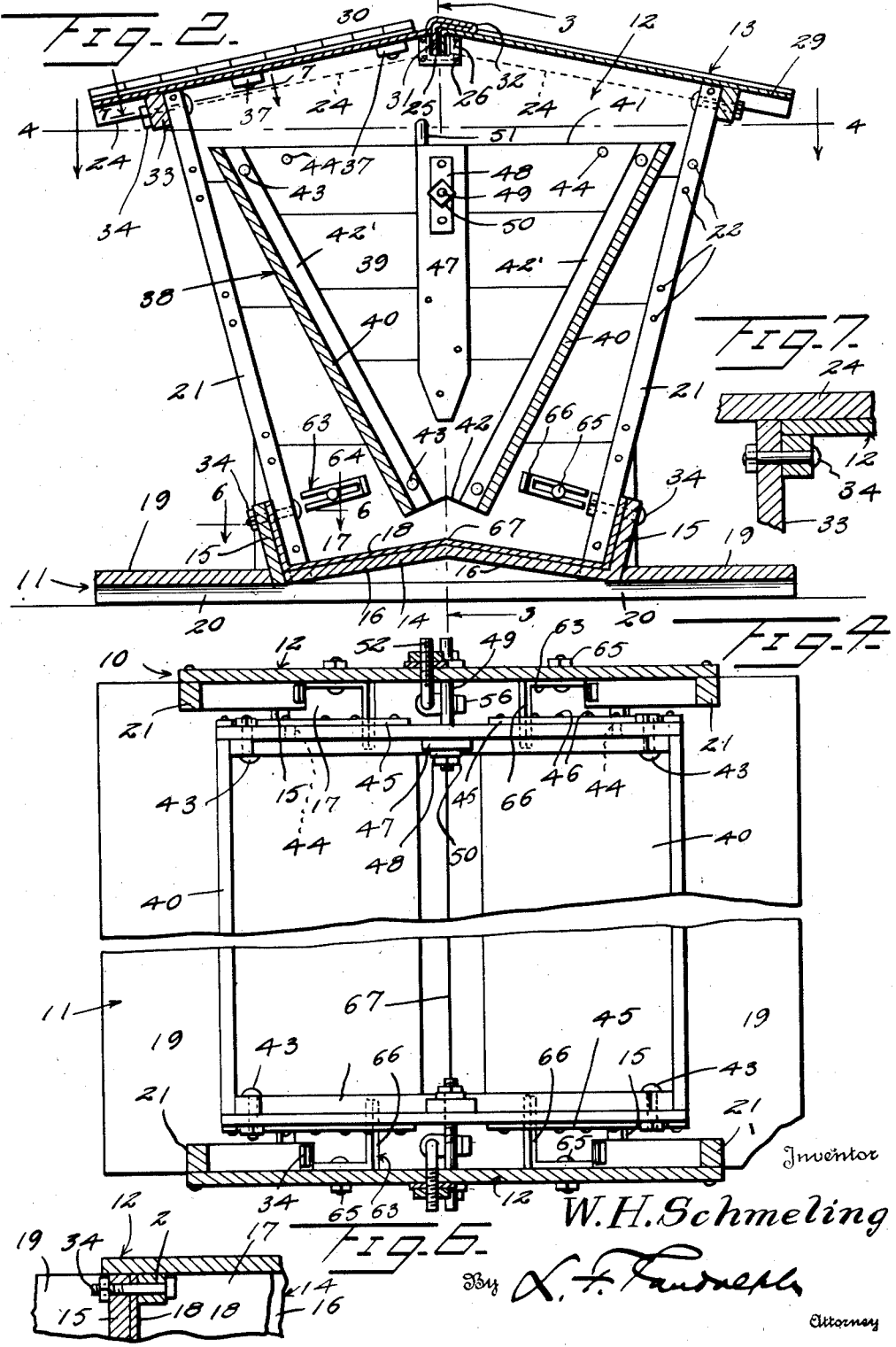

Patented June 30, 1942

2,288,489

UNITED STATES PATENT OFFICE 2,288,489

SELF-FEEDER FOR LIVESTOCK

William H. Schmeling, Edgerton, Wis.

Application June 4, 1941, Serial No. 396,631

4 Claims. (Cl. 119—53.5)

This invention relates to an improved self-feeder for livestock such as hogs, sheep and cattle.

Among the aims of the invention are:

To provide a feeder for livestock which may be used both indoors and outdoors, and which is provided with means for protecting feed in the trough from rain or snow, said means also effectively protecting the feed contained in a hopper disposed above the trough; to provide a self-feeder having a roof which can be readily removed when the hopper is used indoors; to provide a feeder having floor portions at the sides of the trough and on which the fore feet of the animals must be placed while feeding from the trough to prevent the animals from clawing the ground away, adjacent the trough, and to prevent the animals from pushing the feeder; to provide a feeder having a pivotally mounted hopper which is adapted to be swung by the animals for agitating and discharging the feed therefrom and which can be readily filled from above and the feed mixed while in the hopper; to provide means for raising and lowering the hopper relatively to the trough and for effectively holding the hopper in any of a plurality of adjusted positions; to provide means for adjustably limiting the swinging movement of the hopper; and to provide means for adjusting the slope of the side walls of the hopper to vary the flow of the feed to accommodate the hopper for use with different types of feed.

Other objects and advantages of the invention will hereinafter become more fully apparent from the following description of the drawings, which illustrate a preferred embodiment of the self-feeder, and wherein:

Figure 1 is a top plan view of the feeder,

Figure 2 is an enlarged transverse vertical sectional view taken substantially along the plane of the line 2—2 of Figure 1, Figure 3 is a longitudinal vertical sectional view of the feeder taken substantially along a plane indicated by the line 3—3 of Figure 2.

Figure 4 is a fragmentary horizontal sectional view of the feeder taken substantially along a plane indicated by the line 4—4 of Figure 2, Figure 5 is an enlarged detail vertical sectional view taken substantially along the plane of the line 5—5 of Figure 3, Figure 6 is an enlarged horizontal sectional view taken substantially along the plane of the line 6—6 of Figure 2, and Figure 7 is an enlarged horizontal sectional view taken substantially along the plane of the line 7—7 of Figure 2.

Referring more particularly to the drawings, wherein like reference characters designate like or corresponding parts throughout the different views, 10 designates generally a hopper frame including a floor, designated generally 11, end walls, designated generally 12, and a roof, designated generally 13.

The floor 11 includes a longitudinally extending intermediate ridged portion 14 from the side edges of which project wall portions 15 which project upwardly and outwardly relatively to one another and which are disposed substantially at right angles to the section 16 of the ridged portion 14. The adjacently disposed walls 15 and the section 16 combine to form troughs 17 which are closed at their ends by the end walls 12. The troughs 17 are preferably lined with sheet metal, as seen at 18. The floor 11 also includes substantially horizontal floor portions 19 which project outwardly from the outer sides of the troughs 17, for a purpose which will hereinafter be described. The ridged portion 14, the walls 15 and the floor portions 19 are supported on transverse sills 20 which complete the floor 11.

As best seen in Figure 2, the end walls 12 have upwardly diverging longitudinal side edges to the inner sides of which are connected posts 21 by means of fastenings 22. The lower ends of the walls 12 engage against the ends of the ridged portion 14 and the end sills 20. The ridged portion 14 is provided with openings 23. The posts 21, at their lower ends extend through the openings 23 to rest on and be supported by the end sills 20, as seen in Figure 3.

As seen in Figure 2, the upper edges of the end walls 12 are inclined upwardly and inwardly toward their centers and to the outer sides of said upper edges are attached roof rails 24 which extend beyond the side edges of the end walls 12. The end walls 12 are provided with notches at the apex of their upper edges in which are mounted metal socket members 25 which are provided with flanges for receiving fastenings 26 for attaching the socket members 25 to the end walls 12. As seen in Figure 5, each of the end walls 12 is provided with an elongated perpendicularly disposed opening 27 and above and to one side thereof is provided an opening 28, the purpose of said openings 27 and 28 will hereinafter be described.

The roof 13 is formed of sections 29 and 30, each of which is formed of a sheet of corrugated metal. The sections 29 and 30 are provided with downturned adjacent edge portions 31, as seen in Figure 2, which engage in the sockets 25. Section 30, adjacent its edge portion 31, is folded to form a flap 32 which engages over the adjacent portion of the section 29 for closing the space between the flange portions 31. The ends of the roof sections 29 and 30 rest on the roof rails 24 and extend outwardly to the ends thereof to form eaves which extend substantially to points above the outer edges of the floor portions 19. Roof sections 29 and 30 are provided with attaching strips 33 which extend longitudinally of their undersides and adjacent their outer edges and which are connected to the posts 21 by fastenings 34 in such a manner that said fastenings 34 can be readily removed for detaching the roof sections 29 and 30. The lower ends of the posts 21 are similarly connected by fastenings 34 to the walls 15 for attaching the end walls 12 to the floor 11. A portion of the roof section 30, as best seen in Figure 1, is cut-out to form a trap door 35 which is hingedly connected to one end of the roof section 30, as seen at 36, at one of its ends, so that the trap door 35 will swing vertically upwardly along a line transversely of the hopper frame 10. The trap door 35 is provided on its underside with a plurality of longitudinally extending reinforcing strips 37, as best seen in Figure 3, which are suitably fastened thereto.

A hopper, designated generally 38, is provided with substantially triangular shaped end walls 39 and downwardly and inwardly inclined side walls 40 which combine with the end walls 39 to form an enlarged open upper end 41 and a restricted lower open end 42. The side walls 40 are provided with flanges 42', adjacent their ends and which project from their inner sides for receiving fastenings 43 for attaching the sides 40 to the ends 39. The ends 39 are provided with openings 44 which are spaced inwardly from the upper fastenings 43 and which are adapted to receive said fastenings 43 for increasing the inclination of the sides 40 as for example for dispensing a coarse feed which does not flow readily. The end walls 39 may be formed of a plurality of abutting strips or planks which are connected at their ends by straps 45 of metal which are attached to the strips or planks by fastenings 46. On the inner sides of the end walls 39 are mounted perpendicularly disposed strips 47 to each of which is connected a plate 48. Plates 48 are provided with threaded openings, not shown, which register with corresponding openings in the strips 47 and ends 39, not shown, for receiving the threaded ends of rods 49 which project outwardly from the end walls 39. The rods 49 are retained in adjusted positions relatively to the plates 48 by lock nuts 50 and the outer ends of the rods 49 project outwardly through the openings 27 in the end walls 12, as seen in Figure 5.

An inverted L-shaped rod 51 is associated with each of the end walls 12. The rods 51 have their shorter ends 52 projecting outwardly through the openings 28 and their longer ends 53 depending downwardly and forming hangers. The ends 52 and 53 are threaded and the ends 52 are provided with nuts and washers 54 and 55, respectively, which are disposed on the outer sides of the walls 12 for adjustably mounting the rods 51 relatively thereto. A sleeve 56 is slidably mounted on each of the threaded ends 53 and said sleeves 56 are provided with hooks 57 each of which is adapted to engage and support a rod 49. A feed nut 58 is attached to each of the threaded ends 53, beneath the sleeve 56 to provide means for raising and lowering the sleeves for raising and lowering the hopper 38, which is pivotally supported by means of its rods 49 engaging the hooks 57. It will be obvious that the openings 27 permit the rods 49 to be raised and lowered relatively to the end walls 12. On each of the rods 49 is mounted a strap 59 which is provided with an opening 60 adjacent its upper end and through which the rod 49 projects. The straps 59 are disposed on the outer sides of the walls 12 and are provided with elongated openings 61 through which extend bolts of nut and bolt fastenings 62 which are mounted in the walls 12 and the nuts of which are adapted to be tightened for clamping the straps 59 which form hold down means, when the nuts of the fastenings 62 are tightened, to prevent the rods 49 from moving upwardly and disengaging the hooks 57.

The end walls 12 are provided with abutment members 63 having slotted ends 64 which are disposed against the inner sides of the walls 12 and adjustably connected thereto by nut and bolt fastenings 65. The opposite ends 66 of the abutment members 63 project inwardly and are disposed to be engaged by the hopper 38, adjacent its lower end, for limiting the swinging movement of the hopper.

From the foregoing it will be obvious that an animal, not shown, may feed from either of the troughs 17 and by pushing against the sides 40 of the hopper 38 will cause the hopper to swing on the hooks 57 within the limits provided by the abutments 63 to agitate the hopper to cause the contents thereof to flow onto the ridged portion 14 and into the troughs 17. The opening 42 forms the discharge opening of the hopper and is disposed above the apex 67 of the ridged portion 14. It will therefore be apparent that by adjusting the follower nuts 58 the discharge opening 42 may be moved toward or away from the apex 67 of the ridged portion 14 to decrease or increase, respectively, the flow from the hopper 38. The hold down straps 59 will prevent the animals from pushing the hopper 38 sufficiently to raise it and disengage the rods 49 from the hooks 57. The trap door 35 can be opened for filling the hopper 38 and as there is no obstruction, either lengthwise or crosswise of the interior of the hopper the feed may be placed therein and thereafter mixed. The floor portions 19 are of sufficient width so that an animal will have to place his fore feet thereon in order to feed from the trough 17 so that the animal cannot claw the ground adjacent the feeder and cannot push the feeder about and would not be able to overturn it. The eaves of the roof 13 project outwardly a sufficient distance so that the roof will not only protect the hopper 38 but also the troughs 17 from rain, snow and the like.

Various modifications and changes are contemplated and may obviously be resorted to as only a preferred embodiment of the invention has been disclosed.

I claim as my invention:

1. A self-feeder for livestock comprising a supporting structure including a floor portion, end walls and a roof, and a hopper mounted in the supporting structure, said roof being formed of corrugated sheet metal and comprising sections, said sections having downturned adjacent edges, the end walls of said supporting structure being provided with sockets in their upper edges and intermediate of their side edges for receiving the downturned edges of the roof sections, and one of said roof sections being provided with a folded flap portion engaging over the adjacent edge of the other roof section.

2. A self-feeder for livestock comprising a hopper frame including a floor having a longitudinally extending trough intermediate of its side edges, said frame including upstanding end walls, a hopper mounted between said end walls and above said trough, said hopper having an enlarged open upper end and a restricted open lower end, rods projecting from the ends of said hopper and adjacent its top, hangers mounted on the inner sides of said end walls and supported thereby, hooks carried by said hangers for engaging said rods for pivotally mounting the hopper above the trough, and adjustable means on said hangers for adjustment of said hooks relatively to the hangers for raising and lowering the hopper relatively to the trough.

3. A self-feeder as in claim 2, said hopper including upwardly and outwardly diverging side walls and substantially V-shaped end walls, and means for adjustably connecting the upper ends of said side walls of the hopper to the upper ends of its end walls for varying the angle of said side walls.

4. In a self-feeder for livestock, a hopper supporting frame including a floor forming the base of the frame, end walls extending upwardly therefrom, said walls having notches in the intermediate portions of their upper edges, a roof formed of sections, the ends of each of the sections being supported by complementary portions of said upper edges, said sections having adjacently disposed downturned edges for engaging said notches, for connecting the roof sections to the end walls, and one of the roof sections having a flange portion for engaging over the downturned edges.

WILLIAM H. SCHMELING.